United States Patent
Yoshida et al.

(10) Patent No.: US 8,600,210 B2
(45) Date of Patent: Dec. 3, 2013

(54) GI TYPE OPTICAL FIBER AND METHOD FOR MANUFACTURING SAME

(75) Inventors: Hirotsugu Yoshida, Kyoto (JP); Tazuru Okamoto, Kyoto (JP); Ryosuke Nakao, Kyoto (JP); Hiroka Inabe, Kyoto (JP); Yuki Masabe, Kyoto (JP); Yasuhiro Koike, Yokohama (JP)

(73) Assignees: Sekisui Chemical Co., Ltd., Osaka (JP); Keio University, Tokyo (JP)

( * ) Notice: Subject to any disclaimer, the term of this patent is extended or adjusted under 35 U.S.C. 154(b) by 239 days.

(21) Appl. No.: 13/201,685

(22) PCT Filed: Feb. 4, 2010

(86) PCT No.: PCT/JP2010/051567
§ 371 (c)(1),
(2), (4) Date: Aug. 16, 2011

(87) PCT Pub. No.: WO2010/095516
PCT Pub. Date: Aug. 26, 2010

(65) Prior Publication Data
US 2012/0027369 A1    Feb. 2, 2012

(30) Foreign Application Priority Data

Feb. 20, 2009  (JP) ................ 2009-037313
Aug. 6, 2009   (JP) ................ 2009-183167
Dec. 25, 2009  (JP) ................ 2009-294876
Jan. 5, 2010   (JP) ................ 2010-000403

(51) Int. Cl.
*G02B 6/00* (2006.01)

(52) U.S. Cl.
USPC ........... 385/143; 385/141; 385/142; 385/144; 385/145

(58) Field of Classification Search
USPC ............................................ 385/143, 145
See application file for complete search history.

(56) References Cited

U.S. PATENT DOCUMENTS 5,007,706 A * 4/1991 Parker et al. ........... 385/142
6,093,448 A * 7/2000 LaFleur et al. ......... 427/163.2
(Continued)

FOREIGN PATENT DOCUMENTS

| JP | 8-106017 | 4/1996 |
|---|---|---|
| JP | 8-220350 | 8/1996 |
| JP | 2005-221879 | 8/2005 |
| JP | 2008-10837 | 1/2008 |

OTHER PUBLICATIONS

Reason for Refusal issued Jan. 29, 2013 in corresponding Japanese patent application No. 2010-000403.

(Continued)

*Primary Examiner* — Rhonda Peace
(74) *Attorney, Agent, or Firm* — Wenderoth, Lind & Ponack, L.L.P.

(57) ABSTRACT

A GI type optical fiber of the present invention is a GI type optical fiber having a core component and a cladding component disposed around the outer periphery of the core component, the core component includes a polymer containing at least 55 wt % chlorostyrene monomer and a dopant, and the cladding component includes a polymer of a monomer containing at least 35 wt % methyl methacrylate. It is an object of the present invention to provide a GI type optical fiber in which chlorostyrene is used as the predominant component of the monomer that constitutes the core component, and therefore has excellent transparency and good flexibility, and allows high-speed communication.

14 Claims, 1 Drawing Sheet

(56) References Cited

U.S. PATENT DOCUMENTS

| | | | |
|---|---|---|---|
| 7,429,138 B2* | 9/2008 | Nakamura et al. | 385/88 |
| 7,460,756 B2* | 12/2008 | Sato et al. | 385/123 |
| 2001/0004656 A1* | 6/2001 | Koike et al. | 525/199 |
| 2004/0197061 A1* | 10/2004 | Ogura et al. | 385/123 |
| 2005/0175290 A1 | 8/2005 | Mizushima et al. | |
| 2007/0205526 A1* | 9/2007 | Sato et al. | 264/1.24 |
| 2007/0286560 A1* | 12/2007 | Nakamura et al. | 385/124 |
| 2010/0061684 A1 | 3/2010 | Terada et al. | |
| 2012/0027369 A1* | 2/2012 | Yoshida et al. | 385/123 |
| 2012/0034374 A1* | 2/2012 | Okamoto et al. | 427/163.2 |
| 2012/0114291 A1* | 5/2012 | Yoshida et al. | 385/123 |

OTHER PUBLICATIONS

International Search Report issued Mar. 2, 2010 in International (PCT) Application No. PCT/JP2010/051567.

* cited by examiner

GI TYPE OPTICAL FIBER AND METHOD FOR MANUFACTURING SAME

This application is a U.S. national stage of International Application No. PCT/W2010/051567 filed Feb. 4, 2010.

BACKGROUND OF THE INVENTION

1. Technical Field

The present invention relates to a GI type optical fiber (hereinafter sometimes referred to simply as "optical fiber") and a method for manufacturing the same, and more particularly relates to a GI type optical fiber whose core component is a polymer of a monomer whose predominant component is chlorostyrene having high transparency, and to a method for manufacturing this fiber.

2. Background Art

Copper wire has been used in the past for the link systems of video-related devices, but as the quantity of information increases, there is more noise with a copper wire, and this has necessitated excessive countermeasures aimed at reducing noise. In particular, television broadcasts, wired broadcasts, and video recording media have transitioned to high definition in recent years, and therefore optical fibers have come to be used for the link systems of video-related devices, and advantage of which is that there is no need for noise countermeasures.

In view of this, an optical transmission apparatus and optical communications module featuring optical wiring have been proposed, for example (see Japanese Laid-Open Patent Application 2008-10837, for instance). It is stated here that quartz glass fiber, polymer cladding fiber, or plastic fiber is used as the optical wiring.

However, because of the large allowable bending radius of such fibers, very fine wiring is impossible, making it difficult to wire inside the narrow spaces between video devices or inside smaller video devices.

Also known as a plastic fiber is an optical fiber in which the core is made of polymethyl methacrylate or another such methacrylic resin (see Japanese Laid-Open Patent Application H8-106017, for example). Such plastic optical fibers have numerous advantages, such as having good flexibility, being lightweight, being easy to work, allowing easy manufacture of a large diameter fiber and allowing low cost manufacture.

In light of this situation, plastic fibers with good bending resistance continue to be utilized in the link systems of video-related devices, so in addition to bending resistance, there are expected to be further advances in the bandwidth and transmission performance (that is, loss reduction) in plastic fibers, and satisfying all these requirements is something that is eagerly anticipated.

DISCLOSURE OF THE INVENTION

Problem to be Solved

It is an object of the present invention to provide a GI type optical fiber in which chlorostyrene is used as the predominant component of the monomer that constitutes the core component, and therefore has excellent transparency and good flexibility, and allows high-speed communication.

It is a further object of the present invention to provide a method for manufacturing a GI type optical fiber in which a chlorostyrene polymer is used for the core component, which allows coloration under high-temperature environments to be suppressed and affords further improvement in bandwidth and transmission performance (that is, loss reduction).

Means for Solving the Problem

A GI type optical fiber of the present invention is a GI type optical fiber having a core component and a cladding component disposed around the outer periphery of the core component, the core component includes a polymer containing at least 55 wt % chlorostyrene monomer and a dopant, and the cladding component includes a polymer of a monomer containing at least 35 wt % methyl methacrylate.

For such GI type optical fibers, it is preferable that the polymer included in the core component is a polymer as a predominant constituent component whose structural units are monomers including 55 to 100 wt % chlorostyrene and 0 to 45 wt % methyl methacrylate, and the polymer included in the cladding component is a polymer as a predominant constituent component whose structural units are monomers including methyl methacrylate and at least one compound selected from the group consisting of styrene, α-methyl styrene and N-cyclohexylmaleimide.

Also, it is preferably that the polymer included in the cladding component is a polymer as the predominant constituent component whose structural units are 35 to 70 wt % methyl methacrylate, 30 to 65 wt % styrene and 0 to 15 wt % N-cyclohexylmaleimide.

Further, it is preferably that the numerical aperture at one or more wavelengths from 630 to 690 nm, expressed as NA= $(n_1^2-n_2^2)^{1/2}$ (wherein $n_1$ is the refractive index of a center part of the core component, and $n_2$ is the refractive index of the cladding component), is at least 0.25.

Moreover, it is preferably that a center part of the core component includes 100 weight parts of the polymer and 2 to 8 weight parts dopant.

Still further, it is preferably that the chlorostyrene monomer is a monomer whose aniline content is no more than 100 ppm.

Also, it is preferably that it is used in a video-related optical link system.

A method for manufacturing a GI type optical fiber of the present invention has steps of:

subjecting a monomer including chlorostyrene to an aniline removal step so that the aniline concentration is no more than 100 ppm with respect to the total monomer weight, and using a resulting chlorostyrene polymer by polymerizing the monomer thus obtained as a core component to manufacture a plastic optical fiber composed of the core component and a cladding component disposed around the outer periphery of the core component.

On a method for manufacturing another GI type optical fiber of the present invention, a plastic optical fiber composed of a core component and a cladding component disposed around the outer periphery of the core component is manufactured by using for the core component a chlorostyrene polymer obtained in a step of removing aniline from a monomer including chlorostyrene and/or a step of removing dissolved oxygen.

In such the method for manufacturing a GI type optical fiber, it is preferable that the aniline removal step is a method involving adsorptive separation.

It is preferable that the dissolved oxygen removal step is a method involving reduced pressure deaeration under ultrasonic waves, or a method involving bubbling with an inert gas.

On a method for manufacturing still another GI type optical fiber, a plastic optical fiber composed of a core component and a cladding component disposed around the outer periphery of the core component is manufactured by using for the core component a chlorostyrene polymer obtained by polymerizing a monomer in which the aniline content is no more than 100 ppm with respect to the total monomer weight.

Effect of the Invention

The present invention provides a method for manufacturing a GI type optical fiber in which a chlorostyrene polymer, which is the raw material of plastic fibers, is used for the core component, with this fiber having good flexibility, excellent transparency, and suppressed coloration under high-temperature environments, and with this method affording further improvement in bandwidth and transmission performance.

Therefore, it can be used to simply and reliably manufacture a GI type optical fiber that has high quality and high performance and that allows high-speed communication.

DETAILED DESCRIPTION OF THE EMBODIMENTS

Figure 2:
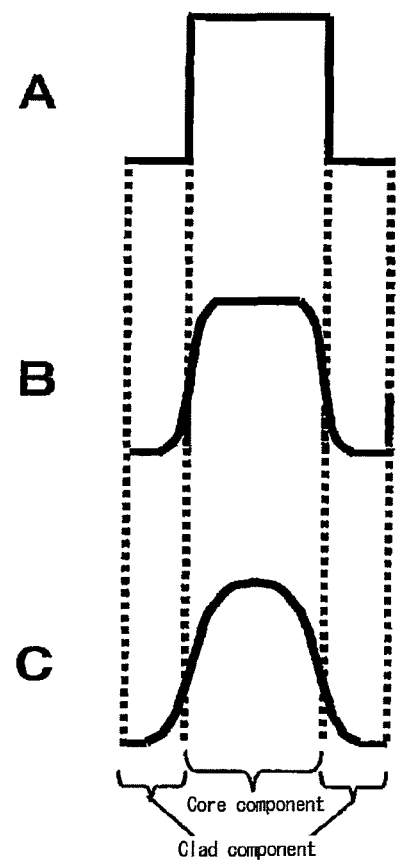
[FIG. 2] is a simplified graph of the distribution of dopant in a dopant diffusion tube in the apparatus shown in FIG. 1.

The optical fiber of the present invention is constituted by a core component and a cladding component that is disposed around the outer periphery of the core component. In this Specification, the terms core component and cladding component are used such that the layer constituted by the polymer serving as the predominant component of the core is called the core component, and the layer constituted by the polymer serving as the predominant component of the cladding is called the cladding component, regardless of core and cladding (that is whether or not there is a dopant) in an optical sense in the GI type optical fiber (see FIG. 2). The term "predominant component" (or "predominant constituent component") as used here means the component used in the greatest weight ratio, or in an amount over 50 wt %.

Optical fibers are normally classified as either multimode optical fibers or single mode optical fibers. Multimode optical fibers are further broken down into a step index (SI) type and a graded index (GI) type that has a refractive index distribution. The optical fiber of the present invention is a GI type. The term "refractive index distribution" as used here means that the refractive index changes in steps at a constant width or on a curve close to a parabola, from the center of the fiber outward in the radial direction. It is especially preferable if the refractive index decreases from the center outward in the radial direction. A refractive index distribution such as this raises the communication speed.

Also, the refractive index may first decrease in a curve or steps and then increase in a curve or steps from the center of the optical fiber outward in the radial direction. In this case, it is preferable if the refractive index is higher in the core component than in the outermost layer of the cladding component, but the outermost layer of the cladding component may have a higher refractive index than the core component.

The polymer that forms the core component of the optical fiber of the present invention is formed using chlorostyrene (hereinafter sometimes abbreviated as "ClSt"), and is favorably formed by a copolymer of monomers include ClSt and methyl methacrylate (hereinafter sometimes abbreviated as "MMA").

It is favorable for the core component to be formed by a polymer in which ClSt is used in an amount of at least 55 wt % of the total monomers that make up the polymer, with at least 60 wt % being preferable, and at least 65 wt % being more preferable. The core component may be a homopolymer in which ClSt is the only monomer, but ClSt preferably accounts for 95 wt % or less, and more preferably 90 wt % or less. It is particularly favorable if the ClSt is contained in the core component in an amount of 55 to 100 wt %, and preferably 60 to 95 wt %, and more preferably 65 to 90 wt %, of the total monomers. Forming the core component by using ClSt in a proportion of at least 55 wt % allows an optical fiber to be obtained that has good transparency and flexibility.

There are no particular restrictions on the ClSt in the present invention as long as at least some of the hydrogens on the benzene ring of the styrene are replaced with chlorine, but it is favorable if one or two of the hydrogens on the benzene ring have been replaced with chlorine. Para-chlorostyrene, in which the para position is replaced with chlorine, is particularly preferable in terms of heat resistance.

The polymer that forms the cladding component of the optical fiber of the present invention is formed using MMA, and is favorably formed by a copolymer whose structural units are MMA and at least one compound selected from the group consisting of styrene (hereinafter sometimes abbreviated as "St"), α-methyl styrene (hereinafter sometimes abbreviated as "α-MeSt"), and N-cyclohexylmaleimide (hereinafter sometimes abbreviated as "NC-HMI").

It is favorable for the cladding component to be formed by a polymer in which MMA is used in an amount of at least 35 wt % of the total monomers, with at least 40 wt % being preferable. The cladding component may be a homopolymer in which MMA is the only monomer, but is favorably formed by a polymer in which MMA is used in an amount of no more than 70 wt % of the total monomers, with 60 wt % or less being more preferable. It is particularly preferable if the MMA is contained in the cladding component in an amount of 35 to 100 wt %, and preferably 35 to 70 wt %, and more preferably 40 to 60 wt %, of the total monomers. Forming the cladding component by using MMA in a proportion of at least 35 wt % allows an optical fiber to be obtained that has good flexibility and that can be used for wiring in tight spaces between video devices or inside video devices.

When styrene is used, it is favorably contained in an amount of 65 wt % or less, and more preferably 30 to 65 wt %, of the total monomers that make up the cladding. When the cladding component is formed using styrene in a proportion of 65 wt % or less, the difference in the refractive index between the core and cladding can be reduced, so the product can be used as a fiber with excellent communication speed.

When α-MeSt is used, it is preferably contained in an amount of 20 wt % or less.

When NC-HMI is used, it is preferably contained in an amount of 35 wt % or less, and more preferably 15 wt % or less. When the cladding component is formed using α-MeSt in a proportion of 20 wt % or less or NC-HMI of 35 wt % or less, the glass transition temperature of the cladding can be raised, and the product can be used as a fiber that has excellent heat resistance while maintaining good flexibility.

In particular, the polymer included in the cladding component is preferably a polymer serving as a predominant constituent component whose structural units are monomers including methyl methacrylate (for example, 35 to 100 wt %)

and at least one compound selected from the group consisting of styrene (for example, 0 to 65 wt %), α-methyl styrene (for example, 0 to 20 wt %) and N-cyclohexylmaleimide (for example, 0 to 35 wt %).

Also, it is more preferably a polymer serving as a predominant constituent component whose structural units are monomers including methyl methacrylate (for example, 35 to 70 wt %), styrene (for example, 30 to 65 wt %) and N-cyclohexylmaleimide (for example, 0 to 15 wt %).

With the optical fiber of the present invention, the core component need not include a dopant, but it preferably includes one in order to make high-speed communication possible. Adding a dopant changes the refractive index of the core component in the optical fiber, and allows a refractive index distribution to be imparted. In particular, adjusting the concentration distribution of the dopant in the core component is an effective way to impart a refractive index distribution.

The cladding component may contain a dopant.

The dopant is preferably a compound that is miscible with polymers produced by the monomers constituting the core component, and that has a refractive index higher than the refractive index of these polymers. Using a compound with good miscibility prevents turbidity in the core component, keeps scattering loss to a minimum, and increases the distance over which communication is possible.

Examples of this dopant include low-molecular weight compounds or compounds in which the hydrogen atoms present in these compounds have been replaced with deuterium atoms. Examples of the low-molecular weight compound include sulfur compounds such as diphenyl sulfone and a diphenyl sulfone derivative, diphenyl sulfide, diphenyl sulfoxide, dibenzothiophene, dithiane derivative; phosphate compounds such as triphenyl phosphate, tricresyl phosphate; 9-bromophenanthrene; benzyl benzoate; benzyl n-butyl phthalate; diphenyl phthalate; biphenyl; diphenyl methane. Among these, phosphate compounds are preferable. These can be used singly or in a combination of two or more.

The amount of the dopant in the core component can be suitably adjusted according to the composition of the polymer that makes up the core component, the intended refractive index, the composition of the polymer that makes up the cladding component being used, the type of the dopant being used, and so forth. For example, the center part of the core component preferably contains 2 to 8 weight parts, and more preferably 2.5 to 7.5 weight parts, per 100 weight parts of the above-mentioned polymer. If the amount of the dopant is adjusted to within this range, the refractive index of the core component can be adjusted to a preferable value, and the decrease in the glass transition point of the core component material caused by the dopant addition can be minimized, so it can be used favorably even under the high-temperature environment inside a video device.

With the optical fiber of the present invention, it is preferable if the numerical aperture at one or more wavelengths from 630 to 690 nm ($NA=(n_1^2-n_2^2)^{1/2}$) is at least 0.25, with at least 0.3 being preferable. Here, $n_1$ is the refractive index of the center part of the core component, and $n_2$ is the refractive index of the cladding component. Setting the numerical aperture in this way reduces bending loss, and allows the product to be used favorably for wiring in tight spaces inside a video device or between video devices.

Part of the inside of the cladding component may include the dopant that has migrated from the core component, and the above-mentioned $n_2$ refers to the refractive index of the portion of the cladding component with the lowest refractive index.

The polymers that make up the core component and cladding component of the optical fiber of the present invention can be manufactured by any method known in this field. For example, a mixture of the monomers constituting the polymer may be subjected to solution polymerization, bulk polymerization, emulsion polymerization, suspension polymerization, or the like. Bulk polymerization is especially desirable from the standpoint of preventing foreign matter and impurities from being admixed. The ClSt that is one component of the monomers used here (and particularly the ClSt used in the core component) may, as discussed below, be a monomer in which the aniline content has been lowered to or below a specific level or from which dissolved oxygen has been removed. This makes it possible to obtain an optical fiber with good transparency and flexibility.

There are no particular restrictions on the polymerization temperature here, but about 80 to 150° C. are preferable. The reaction duration can be suitably adjusted according to the amounts and types of monomers, the amounts of polymerization initiator, chain transfer agent, and so forth as discussed below, the reaction temperature, and so on, about 20 to 60 hours are preferable.

These polymers can be used directly and continuously to form the core component and/or cladding component, as discussed below.

The polymer that makes up the core component is preferably not made from a monomer other than the above-mentioned ClSt and MMA, but may further contain a polymerizable monomer or the like to the extent that the characteristics of the resulting optical fiber are not compromised.

The polymer that makes up the cladding component is preferably not made from a monomer other than the above-mentioned styrene and/or α-MeSt and/or NC-HMI and MMA, but may further contain a polymerizable monomer or the like to the extent that the characteristics of the resulting optical fiber are not compromised.

Examples of the polymerizable monomer include, for example, (meta)acrylate compounds such as ethyl methacrylate, n-propyl methacrylate, n-butyl methacrylate, methyl acrylate, ethyl acrylate, n-propyl acrylate, n-butyl acrylate; styrene compounds such as ClSt, St, α-MeSt, bromostyrene; vinyl esters such as vinyl acetate, vinyl benzoate, vinyl phenyl acetate, vinyl chloroacetate; maleimides such as N-n-butyl maleimide, N-tert-butyl maleimide, N-isopropyl maleimide, N-cyclohexyl maleimide, N-phenyl maleimide; deuterides thereof and so forth.

When the polymer is produced, it is preferable to use a polymerization initiator and/or a chain transfer agent.

Examples of the polymerization initiator include a known radical initiator.

Specific examples include peroxide compounds such as benzoyl peroxide, t-butyl peroxy-2-ethylhexanate, di-t-butyl peroxide, t-butyl peroxy isopropyl carbonate, n-butyl 4,4, bis(t-butyl peroxy) valerate; azo compounds such as 2,2'-azobis isobutyronitrile, 2,2'-azobis(2-methyl butyronitrile), 1,1'-azobis(cyclohexane-1-carbonitrile), 2,2'-azobis(2-methyl propane), 2,2'-azobis(2-methyl butane), 2,2'-azobis(2-methyl pentane), 2,2'-azobis(2,3-dimethyl butane) 2,2'-azobis(2-methyl hexane), 2,2'-azobis(2,4-dimethyl pentane), 2,2'-azobis(2,3,3-trimethyl butane), 2,2'-azobis(2,4,4-trimethyl pentane), 3,3'-azobis(3-methyl pentane), 3,3'-azobis(3-methyl hexane), 3,3'-azobis(3,4-dimethyl pentane), 3,3'-azobis(3-ethyl pentane), dimethyl-2,2'-azobis(2-methylpropionate), diethyl-2,2'-azobis(2-methylpropionate), di-t-butyl-2,2'-azo bis(2-methylpropionate). These can be used singly or in a combination of two or more.

It is preferable to use the polymerization initiator in an amount of about 0.01 to 2 wt % with respect to the total monomers.

The chain transfer agent is usually used for adjusting a molecular weight which is suitably for molding and physical property.

There are no particular restrictions on the chain transfer agent, but a known chain transfer agent may be used. Examples include alkyl mercaptan (n-butyl mercaptan, n-pentyl mercaptan, n-octyl mercaptan, n-lauryl mercaptan, t-dodecyl mercaptan), thiophenols (thiophenol, m-bromothiophenol, p-bromothiophenol, m-toluenethiol, p-toluenethiol). Among these, alkyl mercaptan such as n-butyl mercaptan, n-octyl mercaptan, n-lauryl mercaptan, t-dodecyl mercaptan is preferably used. Further, the chain transfer agent wherein hydrogen atom of the C-H-binding is substituted with heavy hydrogen or fluorine atom may be used. These can be used singly or in a combination of two or more.

The chain transfer constant of the chain transfer agent with respect to each monomer can be found experimentally by referring, for example, to the Polymer Handbook, Third Edition (edited by J. Brandrup and E. H. Immergut, published by John Wiley & Son), "Experimental Methods for Macromolecular Synthesis" (co-authored by Takayuki Ohtsu and Masaetsu Kinoshita, Kagaku Dojin, 1972), and so forth. Thus, the chain transfer constant is preferably taken into account to suitably adjust the type and added amount according to the type of monomer and so on. For example, the amount may be about 0.1 to 4 wt % with respect to the total monomers.

It is good for the chlorostyrene polymer as discussed below and the polymer that makes up the core component and/or cladding component to have a weight average molecular weight of about 100,000 to 300,000, with a range of about 150,000 to 250,000 being preferable. This is to ensure the proper flexibility, transparency, and so forth. The weight average molecular weight indicates the polystyrene equivalent value measured by GPC (gel permeation chromatography), for example.

To the extent that the transparency, heat resistance, and other performance aspects of the optical fiber are not compromised, the polymers that make up the optical fiber of the present invention may contain as needed other additives such as a thermal stabilizer, a processing aid, a heat resistance improver, an antioxidant or an light stabilizer. These can be added singly, or a combination of two or more may be used.

It is particularly preferable to add an antioxidant, which reduces coloration of the resulting polymer. There are no particular restrictions on the added antioxidant so long as it has excellent dispersibility or solubility in the monomer mixture or copolymer, and the antioxidant itself does not contribute to coloration. Examples of such antioxidants include phenol-based antioxidants, amine-based antioxidants, phosphorus-based antioxidants and sulfur-based antioxidants. Among these, a phenol-based antioxidant is preferable because it has little coloration itself and directly inactivates any radicals that are generated.

The antioxidant is preferably used in an amount of at least about 10 ppm with respect to the weight of the total monomers. About 4000 ppm or less is favorable, with 2500 ppm or less being preferable, and 1250 ppm or less being more preferable. Within this range, the antioxidant itself will have no coloration effect, and transmission loss due to scattering can be suppressed.

Examples of the heat resistance improver include, for example, α-methyl styrene-based and N-maleimide-based heat resistance improvers.

Examples of the light stabilizer include, for example, hindered amine light stabilizers.

Examples of how these blends are mixed with monomers or polymers include hot blending, cold blending and solution mixing.

The GI type optical fiber of the present invention may also be manufactured by using a chlorostyrene polymer manufactured by the following manufacturing method, in which first a monomer including chlorostyrene (ClSt) is provided, and then the aniline is removed and/or dissolved oxygen is removed from the monomer including chlorostyrene.

The monomer including chlorostyrene may be a monomer that includes only chlorostyrene, but may also be a monomer mixture including another monomer, as mentioned above. That is, methyl methacrylate and the like are examples of these other monomers, as discussed above. Also, to the extent that the characteristics of the resulting optical fiber are not compromised, another polymerizable monomer or the like may be contained, as also mentioned above.

When monomers are mixed, it is suitable for the polymer used to form the core component to have ClSt and so forth mixed within the range given above.

The above-mentioned monomer (including a monomer mixture) is subjected to an aniline removal step. In other words, the monomer or monomer mixture is preferably treated so that the aniline concentration is no more than 100 ppm with respect to the total monomer weight, with 50 ppm or less being preferable, and it is more preferable for the concentration to be below the detection limit of an ordinary measurement apparatus.

The inventors conducted various studies into plastic optical fibers with which bending resistance and bandwidth or transmission performance (that is, loss reduction) could be further enhanced, and to this end they developed an optical fiber composed of a core component and a cladding component disposed around the outer periphery of the core component, in which the core component includes a dopant and a polymer containing at least 55 wt % chlorostyrene monomer, and the cladding component includes a polymer of a monomer containing at least 35 wt % methyl methacrylate.

Meanwhile, a new problem was discovered, which is that when this optical fiber is exposed to a high-temperature environment, it is modified and undergoes coloration, so the long-term high-temperature durability is markedly compromised, and there is an increase in the transmission loss of the optical fiber. The inventors conducted diligent research into the cause of this problem. As a result, they found that an oxidation-denatured aniline will be produced during polymerization if aniline, dissolved oxygen, or other such impurities are present in the chlorostyrene monomer used as a raw material. They also newly learned that when an optical fiber in which this polymer is used as the core component is exposed to a high-temperature environment, this oxidation-denatured aniline causes yellowing and affects absorption from the near ultraviolet region to the near infrared region, and as a result, the transmission loss of the optical fiber worsens.

When a commercially available ClSt monomer is used, a step of removing the polymerization inhibitor, impurities, and so forth from the raw material by distillation is usually performed prior to polymerization. However, the boiling point of aniline is close to that of ClSt (the boiling point of ClSt: 189° C. and aniline: 185° C.), and therefore aniline and ClSt cannot be sufficiently separated by ordinary single distillation. Accordingly, if a polymer is formed using a monomer such as this, aniline will remain during polymerization, and dissolved oxygen will also be present during polymerization.

If the resulting polymer is exposed to a high-temperature environment, coloration by the oxidation-denatured aniline will result in yellowing, which leads to the problems mentioned above.

There are no particular restrictions on the method for removing aniline or the method for lowering the aniline content to 100 ppm or less, and any known technique can be used. For example, distillation, adsorption treatment, extraction by alkali, crystallization, or another such method can be used. An adsorption treatment is particularly preferable because of its simplicity. Also, when a distillation method is used, since the boiling point of ClSt is close to that of aniline, sufficient separation is difficult with distillation and refinement using a simple distilling device, so multistage distillation or another such precision distillation method is preferred.

Examples of the specific method for adsorptive separation include adsorptive separation using a column packed with silica gel, zeolite, activated carbon, an ion exchange/chelating resin, or another such adsorbent, adsorptive separation using a polymer membrane, adsorptive separation using a crosslinked polymer with a porous structure or another such synthetic adsorption material, adsorptive separation using an inorganic porous material, and methods involving the use of diatomaceous earth, apatite, activated white clay, or the like.

This aniline removal step is favorably carried out on all the monomers used to manufacture the polymer, but since it is carried out for the purpose of removing the aniline contained as an impurity in the chlorostyrene as discussed above, it need not necessarily be carried out on all the monomers used to manufacture the polymer, and may instead be carried out only for chlorostyrene, and a chlorostyrene polymer may be manufactured using chlorostyrene from which aniline has been removed and any other polymerizable monomer.

With the method of the present invention for manufacturing a GI type optical fiber in which a chlorostyrene polymer is used for the core component, in addition to the aniline removal step discussed above, it is preferable to subject the above-mentioned monomer (including a monomer mixture) to a dissolved oxygen removal step, either before and after the aniline has been removed, or in place of the aniline removal step. The extent to which oxygen is removed is discretionary, but preferably the oxygen is removed from the monomer or monomer mixture to a level below the detection limit of an ordinary measurement apparatus (such as a UC-12-sol, made by Central Kagaku).

There are no particular restrictions on the method for removing dissolved oxygen, and any known method can be used. Examples include bubbling with an inert gas, reduced pressure deaeration under ultrasonic waves, freeze-dry deaeration, passage through a deaeration member, passage through a commercially available degassing module, and passage through columns of reduced copper and activated alumina. A method involving reduced pressure deaeration under ultrasonic waves and a method involving bubbling with an inert gas are particularly preferable because of their simplicity.

More specifically, an example of such a method is one in which a container whose pressure can be reduced and which contains a monomer or monomer mixture is immersed in an ultrasonic vibration tank filled with water, and vacuum deaeration is performed under ultrasonic waves. The ultrasonic waves here have a frequency of about 15 to 200 kHz, for example. The deaeration time favorably ranges from about a few dozen seconds to a few hours, and about 1 to 60 minutes is preferable.

Nitrogen gas, argon gas, helium gas, and other such inert gases can be used as the inert gas. It is favorable for the bubbling to be performed using an inert gas in an amount of about the same as that of the total monomer volume (or weight), up to about 20 times this amount, over a period of from about a few dozen seconds to an hour.

The dissolved oxygen removal step is favorably carried out on the total monomers used to manufacture the polymer.

The monomer that has undergone the aniline removal and/or dissolved oxygen removal step is then polymerized.

Any method known in this field, as mentioned above, can be utilized to polymerize the chlorostyrene-containing monomer.

Any method known in this field can be utilized to manufacture the optical fiber of the present invention. For example, interfacial gel polymerization, rotary polymerization, melt extrusion dopant diffusion, compound melt spinning, a rod-in-tube method, or the like can be utilized to form one or more layers of cladding component around the outer periphery of one or more layers of core component. Also, a preform may be obtained in advance, and then subjected to stretching, wire drawing, or the like, but a fiber may also be formed directly by the method discussed above.

More specifically, an example is a method in which a hollow cladding component is produced, and a core component is produced in the hollow part of this cladding component. In this case, the monomer that makes up the core component is introduced into the hollow part of the cladding component, and the cladding component is rotated while a polymer is obtained, which forms a core component having a refractive index higher than that of the cladding component. This procedure may be performed just once to form a single layer of core component, or it may be repeated to form a core component consisting of a plurality of layers.

The polymerization vessel that is used can be a vessel (tube) with a cylindrical shape and made of glass, plastic, or metal, and one that is heat resistant during heating polymerization and has enough mechanical strength to withstand centrifugal force and other such external forces produced by rotation.

The rotational speed of the polymerization vessel during polymerization is about 500 to 3000 rpm, for example.

It is usually preferable to filter the monomer so that it is introduced into the polymerization vessel after any dust contained in the monomer has been removed.

Furthermore, the core component and cladding component may be formed using a multilayer (two or more layers) die and a multilayer spinning nozzle, etc.

The polymers, etc., that make up the core component and cladding component are each heated and melted, and injected into a multilayer die and a multilayer spinning nozzle from individual channels. Simultaneously with the extrusion molding of the core component with this die and nozzle, one or more layers of concentric circular cladding component are extruded around the outer periphery thereof, and the two are integrally fused together to form a fiber or a preform.

The desired GI type optical fiber can be manufactured according to whether or not the dopant is contained in the core component and/or the cladding component, whether or not the dopant diffusion is performed before and after the formation of the above-mentioned optical fiber or preform, and so forth.

For example, to impart a GI-type refractive index distribution in the optical fiber, as discussed in WO 93/08488, for instance, it is possible to employ a rotary gel polymerization method in which the monomer compositional ratio is fixed, the dopant is added, the monomers are bulk polymerized at the polymer interface, and interfacial gel polymerization, or a reaction mechanism for this interfacial gel polymerization, that imparts a concentration distribution to the dopant by means of this reaction is performed by rotary polymerization; or a method in which the compositional ratio for the dopant and monomers of different refractive indexes are supplied is steadily varied, or in other words, the polymerization ratio of the front layer is controlled (the polymerization ratio is lowered), the next layer that will have a higher refractive index is polymerized, and rotary polymerization is performed so that the refractive index distribution steadily increases from the interface with the cladding component to the center part.

Examples of other methods include melt extrusion dopant diffusion, in which the core component and cladding component are formed using two or more melt extruders and a multilayer (two or more layers) die and a multilayer spinning nozzle, after which the dopant is diffused toward the periphery or the center with a heat treatment zone that is provided, and a dopant concentration distribution is imparted; and a method in which polymers or the like with different dopant contents are introduced into two or more melt extruders, and the core component and/or the cladding component is extruded with a multilayer structure.

When a multistep-type of refractive index distribution is imparted, it is preferable in the rotary polymerization, etc., if the polymerization ratio of the front layer is controlled (the polymerization ratio is raised), and the next layer that will have a higher refractive index is polymerized.

When a preform of an optical fiber is formed by one of the above methods, for example, a plastic optical fiber can be produced by melt drawing this preform. This drawing is accomplished, for example, by a method in which the preform is heated and melted by being passed through interior of a heating furnace or the like, after which it is drawn and spun. The heating temperature can be favorably determined according to the material of the preform and so forth. An example is about 180 to 250° C. The drawing conditions (drawing temperature, etc.) can be favorably adjusted after taking into account the diameter of the preform to be obtained, the diameter of the desired optical fiber, the materials being used, and so on.

When the core component is produced by rotary gel polymerization or rotary polymerization, the center part will be hollow, so the preform is preferably drawn while under reduced pressure from the top during the drawing.

A heat treatment may also be performed at any stage. This heat treatment will diffuse the dopant toward the periphery or the center part of the optical fiber or preform. The conditions here (such as the temperature, duration, pressure, and atmosphere composition) are preferably adjusted favorably.

The optical fiber of the present invention can be put to use directly in this form. Or, its outer periphery can be covered with one or more resin layers, fiber layers, metal wire, or the like, and/or a plurality of fibers can be bundled, allowing application to a variety of different applications such as optical fiber cables.

There are no particular restrictions on the resin for covering the optical fiber, but it is preferable to select one satisfying the strength, flame retardance, flexibility, chemical resistance, heat resistance necessary for optical fiber cables. Examples thereof include a resin containing a vinyl chloride resin, a chlorinated vinyl chloride resin, a chlorinated polyethylene resin, a polyethylene resin, an acryl resin, a fluoric resin, a polycarbonate resin, a nylon resin, a polyester resin, an ethylene-vinyl acetate copolymer, an ethylene-vinyl acetate copolymer, a vinyl chloride-ethylene-vinyl acetate copolymer, a vinyl acetate-vinyl chloride copolymer, or the like as a predominant component. In addition, a composition in which the additive described above is added to these resin may be used.

Examples of the fiber include aramid fiber, polyester fiber, polyamide fiber.

Examples of the metal wire include a stainless steel wire, a zinc alloy wire and a copper wire.

There are no particular restrictions on the method for covering the outer periphery of the optical fiber with resin, but an example is to extrude a covering onto the top layer after the optical fiber has been formed.

A cable in which an optical fiber is used is preferably securely fixed to a jack using a connecting optical plug at the end. Connectors made up of a plug and a jack that can be used include PN type, SMA type, SMI type, F05 type, MU type, FC type, SC type, and various other such commercially available connectors. Or, rather than using a connecting plug at the end of a cable featuring an optical fiber, an OptoLock (trade name of Firecomms) or another such plugless connector may be attached to the connected device side such as a media converter, and a cut-off cable can be inserted and connected.

The optical fiber of the present invention can be used to advantage in a video-related optical link system. In particular, it can be used as wiring for sending digital signals and/or sending an amount of light, in audio applications, in-plant communications applications, on-board automotive communications applications (navigation systems, road and traffic management systems, automatic toll collection systems, and so forth), in-home communications applications, decorative or lighting applications (signs, billboards, building lighting, pool lighting, optical fiber decorative articles, beauty shop lighting, fiber screens, and so forth), video applications, optical inspection, sensors, or other such industrial applications, medical applications, and so on.

There are no particular restrictions on the wavelength of the light source, but visible light or near infrared light can be used from the standpoint of practicality. Visible light is preferable in terms of safety, moreover.

Examples of the GI type optical fiber of the present invention and its method of manufacture will now be described in detail, but the present invention is not limited to or by the following examples.

(Fiber Production Method:Melt Extrusion Dopant Diffusion Method)

Figure 1:
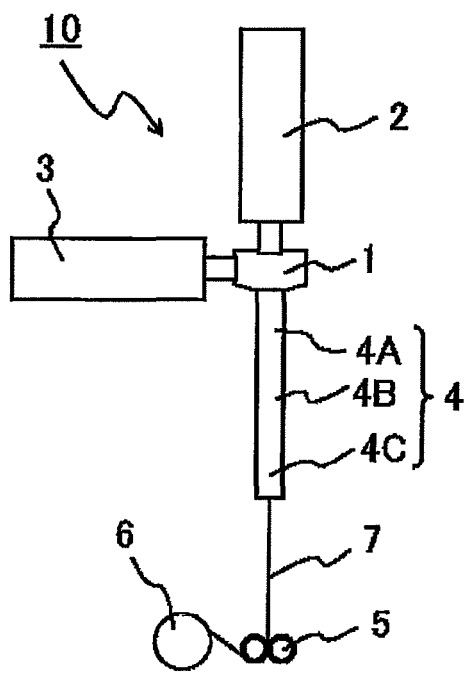
[FIG. 1] is a simplified diagram of a melt extrusion dopant diffusion apparatus for manufacturing the optical fiber of the present invention.

The melt extrusion dopant diffusion apparatus 10 shown in FIG. 1 was used to produce a fiber by melt extrusion dopant diffusion method.

The melt extrusion dopant diffusion apparatus 10 in FIG. 1 is such that a core component extruder 2 and a cladding component extruder 3 are linked on one side of a two-layer mold 1 used for the core component and the cladding component. A dopant diffusion tube 4 is disposed on the other side of the two-layer mold 1, and a take-up roll 6 is disposed downstream of this, via a roll 5.

Example 1

An optical fiber was produced by employing a melt extrusion dopant diffusion method.

Para-chlorostyrene (hereinafter also referred to as "pClSt") and MMA were distilled and filtered, and were mixed with triphenyl phosphate (hereinafter also referred to as "TPP") used as a dopant in a weight ratio of 90:10:6.4. Di-tert-butyl peroxide as a polymerization initiator and n-lauryl mercaptan as a chain transfer agent were further added so that their concentrations in the total weight were 0.1 wt % and 1 wt %, respectively. This mixture was introduced into a polymerization vessel, and the monomers were polymerized over a period of 40 hours while the temperature of the polymerization vessel was held at 130° C., which produced a core component rod with an outside diameter of 30 mm.

Also, styrene and MMA were distilled and filtered and mixed in a weight ratio of 50:50. Di-tert-butyl peroxide as a polymerization initiator and n-lauryl mercaptan as a chain transfer agent were added so that their concentrations in the total weight were 0.5 wt % and 1 wt %, respectively. This mixture was introduced into a polymerization vessel, and the monomers were polymerized over a period of 40 hours while the temperature of the polymerization vessel was held at 130° C., which produced a cladding component rod with an outside diameter of 30 mm.

Then, the core component rod and cladding component rod thus produced were put into the core component extruder 2 and the cladding component extruder 3, respectively, of the above-mentioned melt extrusion dopant diffusion apparatus 10, where they were melted and extruded into the two-layer mold 1 at 200° C. This formed a core component/cladding component structure with a concentric circular shape.

The structure thus obtained was introduced into the dopant diffusion tube 4, and the dopant was diffused at 200° C., which caused the dopant contained in the core component to diffuse radially from the core component region into the cladding component region, and imparted refractive index distribution. The dopant distribution of the structure obtained here changed as shown in FIGS. 2A to 2C going from the introduction part 4A, the center part 4B, and the exit part 4C of the dopant diffusion tube 4.

The GI plastic optical fiber 7 (diameter of 300 μm) thus obtained was wound on the take-up roll 6 via the roll 5.

The fiber produced in this manner was subjected to the following measurement and testing.

NA measurement method: The NA was measured at 665 nm using a far field pattern measurement device.

Method for measuring dopant concentration in center part of core component: The IR spectrum of the center part of the core component of a sample taken as a cross section (perpendicular to the axis) of the optical fiber sliced in a thickness of about 10 μm was measured by transmission method using a microscope IR apparatus with a spot diameter of 10 μm. The dopant concentration was determined using a calibration line produced ahead of time from the IR absorbance ratio.

Glass transition point (Tg) of core component material including dopant concentration of core component center: pClSt, MMA, and the dopant were mixed so as to achieve the analyzed dopant concentration, a polymer was produced by polymerization under the same conditions as in the polymerization of the core component material, and the Tg of this polymer was measured by DSC method at a temperature elevation rate of 10° C./min and under a nitrogen atmosphere.

Glass transition point (Tg) of cladding component material: Using as a sample a bulk polymer made from a cladding material, this was measured by DSC method in the same manner as above.

Loss measurement: The transmission loss at 665 nm was measured by cut-back method for the produced fiber.

Bandwidth measurement: The transmission bandwidth at 650 nm and with restricted-mode launch using a quartz multimode fiber with a core diameter of 50 μm was measured for the 20 m-fiber.

Bending loss measurement: The increase in loss of light of 665 nm was measured in a state in which the fiber was bent 180° at a bending radius of 10 mm, with respect to a state in which the fiber is allowed to relax naturally. The loss increase was measured as set forth in JIS 6823.

Winding test: The optical fiber was wound five times around a rod with a diameter of 10 mm, after which the increase in loss after release (the increase in loss after release with respect to before winding) was measured (in Table 1, "broke" means that the measurement light was not transmitted at all after release).

These results are given in Table 1.

Examples 2 to 7 and 10 TO 14, and Comparative Examples 1 to 4

As shown in Table 1, other than changing the ratios of the core component and cladding component (and in particular employing a ternary copolymer for the cladding component material in Examples 11 to 14 and Comparative Example 4), optical fibers were produced and evaluated just as in Example 1.

These results are given in Table 1.

Example 8

Other than changing the dopant to dibenzothiophene (hereinafter also referred to as "DBT"), an optical fiber was produced and evaluated just as in Example 1.

These results are given in Table 1.

Example 9

Other than changing the dopant to 4,4'-dichlorophenylsulfon (hereinafter also referred to as "2ClDPS"), an optical fiber was produced and evaluated just as in Example 1.

These results are given in Table 1.

TABLE 1

| | Proportion | | | | | | | | | Center | |
| | Core | | | Cladding | | | 665 nm | 650 nm | Bending | Winding | part of | |
| | pClSt (wt %) | MMA (wt %) | Dopant* (part by wt.) | St | MMA (wt %) | NA | loss (dB/km) | bandwidth (GHz) | loss (dB) | test (dB) | core Tg (° C.) | Cladding Tg (° C.) |
|---|---|---|---|---|---|---|---|---|---|---|---|---|
| | | | | | | Examples | | | | | | |
| 1 | 90 | 10 | TPP | 6.4 | 50 | 50 | 0.40 | 700 | 1.3 | 0.1 | 0 | 98 | 95 |
| 2 | 80 | 20 | TPP | 5.8 | 45 | 55 | 0.37 | 670 | 1.6 | 0.17 | 0 | 100 | 95 |
| 3 | 70 | 30 | TPP | 5.8 | 60 | 40 | 0.25 | 680 | 3.7 | 0.8 | 0 | 99 | 94 |
| 4 | 60 | 40 | TPP | 5.3 | 0 | 100 | 0.46 | 820 | 0.9 | 0.04 | 0 | 99 | 103 |
| 5 | 60 | 40 | TPP | 3.1 | 0 | 100 | 0.45 | 810 | 0.6 | 0.05 | 0 | 107 | 103 |
| 6 | 60 | 40 | TPP | 5.3 | 55 | 45 | 0.21 | 820 | 4.8 | 1.43 | 0 | 99 | 94 |
| 7 | 90 | 10 | TPP | 8.7 | 50 | 50 | 0.40 | 700 | 1.2 | 0.1 | 0 | 91 | 95 |
| 8 | 90 | 10 | DBT | 6.4 | 50 | 50 | 0.40 | 710 | 1.3 | 0.09 | 0 | 95 | 95 |

TABLE 1-continued

| | Proportion | | | | | | | | | | Center | |
|---|---|---|---|---|---|---|---|---|---|---|---|---|
| | Core | | | | Cladding | | | 665 nm | 650 nm | Bending | Winding | part of | |
| | pClSt (wt %) | MMA | Dopant* (part by wt.) | | St (wt %) | MMA | NA | loss (dB/km) | bandwidth (GHz) | loss (dB) | test (dB) | core | Cladding Tg (° C.) |
| 9 | 90 | 10 | 2ClDPS | 6.4 | 50 | 50 | 0.40 | 750 | 1.2 | 0.1 | 0 | 102 | 95 |
| 10 | 100 | 0 | TPP | 6.4 | 50 | 50 | 0.44 | 800 | 0.9 | 0.06 | 0.2 | 99 | 95 |
| 11 | 80 | 20 | TPP | 5.8 | 38 α-MeSt: 12 | 50 | 0.41 | 680 | 1.2 | 0.11 | 0 | 100 | 98 |
| 12 | 80 | 20 | TPP | 5.8 | 36 NC-HMI: 21 | 43 | 0.38 | 670 | 1.2 | 0.16 | 0.15 | 100 | 111 |
| 13 | 80 | 20 | TPP | 5.8 | 42 NC-HMI: 7 | 51 | 0.38 | 670 | 1.5 | 0.16 | 0 | 100 | 100 |
| 14 | 80 | 20 | TPP | 5.8 | 25 α-MeSt: 25 | 50 | 0.38 | 680 | 1.4 | 0.11 | 0 | 100 | 85 |
| Comparative Examples | | | | | | | | | | | | | |
| 1 | 90 | 10 | TPP | 6.4 | 70 | 30 | 0.31 | 720 | 2.4 | 0.33 | 0.5 | 98 | 94 |
| 2 | 80 | 20 | 0 | | 45 | 55 | 0.36 | 660 | 0.3 | 0.17 | 0 | 121 | 95 |
| 3 | 50 | 50 | TPP | 5.3 | 0 | 100 | 0.42 | 1400 | 1.2 | 0.06 | 0 | 98 | 103 |
| 4 | 80 | 20 | TPP | 5.8 | 26 NC-HMI: 42 | 32 | 0.42 | 680 | 1.1 | 2.65 | broke | 100 | 130 |

The Dopant* in Table 1 expresses the concentration at the center.

Example 15

(Manufacture of Chlorostyrene Polymer:Aniline Removal)

ClSt (made by Hokko Chemical) and MMA were each distilled, and a monomer mixture was prepared so that the weight ratio of the monomers was 90:10. 500 mL of this liquid mixture was slowly supplied from the top of a column (such as Inhibitor Removers (made by Aldrich)) packed with 250 g of silica gel, and a monomer mixture from which aniline had been removed was obtained from the bottom.

The aniline content was measured for the monomer mixture thus obtained.

Aniline content: Analysis of the aniline concentration in the monomer mixture was performed using a GC/MS analyzer (GC 2010/GCMS-QP 2010 (made by Shimadzu)). The concentration was found on the basis of the surface area ratio between the peak attributable to an internal reference and the peak attributable to aniline.

This result is given in Table 2.

TPP as a dopant was mixed with the monomer mixture of ClSt and MMA that underwent the aniline removal step, so that the weight ratio of ClSt:MMA:TPP=90:10:6.4. This product was filtered, and di-tert-butyl peroxide as a polymerization initiator and n-lauryl mercaptan as a chain transfer agent were added so that their respective concentrations in the total weight would be 0.1 wt % and 1 wt %.

This product was introduced into a polymerization vessel, and the monomers were polymerized over a period of 40 hours while the temperature of the polymerization vessel was held at 130° C., which produced a core component rod with an outside diameter of 30 mm.

(Optical Fiber Production:Melt Extrusion Dopant Diffusion Method)

For manufacturing a cladding component rod, styrene and MMA were distilled and filtered and mixed in a weight ratio of 50:50. Di-tert-butyl peroxide as a polymerization initiator and n-lauryl mercaptan as a chain transfer agent were added so that their concentrations in the total weight were 0.5 wt % and 1 wt %, respectively. This mixture was introduced into a polymerization vessel, and the monomers were polymerized over a period of 40 hours while the temperature of the polymerization vessel was held at 130° C., which produced a cladding component rod with an outside diameter of 30 mm.

Then, the core component rod and cladding component rod thus produced were put into the core component extruder 2 and the cladding component extruder 3, respectively, of the above-mentioned melt extrusion dopant diffusion apparatus 10, where they were melted and extruded into the two-layer mold 1 at 200° C. This formed a core component/cladding component structure with a concentric circular shape.

The structure thus obtained was introduced into the dopant diffusion tube 4, and the dopant was diffused at 200° C., which caused the dopant contained in the core component to diffuse radially from the core component region into the cladding component region, and imparted refractive index distribution. The dopant distribution of the structure obtained here changed as shown in FIGS. 2A to 2C going from the introduction part 4A, the center part 4B, and the exit part 4C of the dopant diffusion tube 4.

The GI plastic optical fiber 7 (diameter of 300 µm) thus obtained was wound on the take-up roll 6 via the roll 5.

The plastic optical fiber thus obtained was evaluated as follows.

Loss measurement: The transmission loss (units of dB/km) at 780 nm was measured by 10-meter insertion loss method for the produced fiber. After this, the fiber was allowed to stand for 3000 hours in a circulating dryer set at 70° C., after which the loss value (units of dB/km) was measured again.

Evaluation of Yellowing: The rod prior to extrusion molding was cut to a thickness of 1 cm, and the surface was polished. After this, the optical transmissivity at 400 nm before and after standing for 3000 hours at 85° C. was measured with a UV-Vis spectrophotometer (made by Shimadzu).

These results are given in Table 2.

Example 16

(Manufacture of Chlorostyrene Polymer:Dissolved Oxygen Removal)

ClSt and MMA were each distilled and filtered, and TPP as a dopant was mixed with them so that the weight ratio was 90:10:6.4. Di-tert-butyl peroxide as a polymerization initiator and n-lauryl mercaptan as a chain transfer agent were added so that their respective concentrations in the total weight would be 0.1 wt % and 1 wt %.

This mixture was put in a pressure-resistant sealed vessel equipped with a nozzle, the entire vessel was placed in an ultrasonic bath filled with water, and reduced-pressure deaeration was performed for 3 minutes with a vacuum pump under ultrasonic waves of 40 kHz.

After this, the vessel was filled with nitrogen gas and returned to atmospheric pressure.

The monomer mixture thus obtained was measured for aniline content in the same manner as in Example 15. This result is given in Table 2.

These were introduced into a polymerization vessel, and the monomers were polymerized over a period of 40 hours while the temperature of the polymerization vessel was held at 130° C., which produced a core component rod with an outside diameter of 30 mm.

After this, a fiber was produced by melt extrusion dopant diffusion method in the same manner as in Example 15.

Example 17

(Manufacture of Chlorostyrene Polymer:Dissolved Oxygen Removal)

ClSt and MMA were distilled and filtered, and TPP as a dopant was mixed with them so that the weight ratio was 90:10:6.4. Di-tert-butyl peroxide as a polymerization initiator and n-lauryl mercaptan as a chain transfer agent were added so that their respective concentrations in the total weight would be 0.1 wt % and 1 wt %.

This mixture was cooled with ice, and nitrogen gas was blown in for 10 minutes at a flow rate of 200 cc/minute.

The monomer mixture thus obtained was measured for aniline content in the same manner as in Example 15. The result is given in Table 2.

These were introduced into a polymerization vessel, and the monomers were polymerized over a period of 40 hours while the temperature of the polymerization vessel was held at 130° C., which produced a core component rod with an outside diameter of 30 mm.

After this, a fiber was produced by melt extrusion dopant diffusion method in the same manner as in Example 15.

Example 18

(Manufacture of Chlorostyrene Polymer:Dissolved Oxygen and Aniline Removal)

ClSt and MMA were distilled, and a mixture of these monomers was passed through a silica gel column to remove the aniline in the same manner as in Example 15.

After this, TPP as a dopant was mixed with the monomers so that the weight ratio was 90:10:6.4, and this was filtered. Di-tert-butyl peroxide as a polymerization initiator and n-lauryl mercaptan as a chain transfer agent were added so that their respective concentrations in the total weight would be 0.1 wt % and 1 wt %.

This was put in a pressure-resistant sealed vessel equipped with a nozzle, the entire vessel was placed in an ultrasonic bath filled with water, and reduced-pressure deaeration was performed for 3 minutes with a vacuum pump under ultrasonic waves of 40 kHz.

After this, the vessel was filled with nitrogen gas and returned to atmospheric pressure.

The monomer mixture thus obtained was measured for aniline content in the same manner as in Example 15. These results are given in Table 2.

These were introduced into a polymerization vessel, and the monomers were polymerized over a period of 40 hours while the temperature of the polymerization vessel was held at 130° C., which produced a core component rod with an outside diameter of 30 mm.

After this, a fiber was produced by melt extrusion dopant diffusion method in the same manner as in Example 15.

Comparative Example 5

ClSt and MMA were each distilled and filtered, and TPP as a dopant was mixed with them so that the weight ratio was 90:10:6.4. Di-tert-butyl peroxide as a polymerization initiator and n-lauryl mercaptan as a chain transfer agent were added so that their respective concentrations in the total weight would be 0.1 wt % and 1 wt %.

The monomer mixture thus obtained was measured for aniline content in the same manner as in Example 15. This result is given in Table 2.

This was introduced into a polymerization vessel without treatments of aniline removal and dissolved oxygen removal, which produced a core component rod in the same manner as in Example 15.

TABLE 2

| | | | Transmission loss unit: dB/km | | | |
| | | | Transmission Loss (780 nm) | | Transmissivity (400 nm) | |
| | Process | Aniline Conc. (ppm) | Initial | After 3000 H | Initial | After 3000 H |
|---|---|---|---|---|---|---|
| Ex. 15 | Aniline Removal | 50 | 700 | 700 | 0.9 | 0.8 |
| Ex. 16 | Dissolved $O_2$ Removal | 200 | 710 | 720 | 0.9 | 0.7 |
| Ex. 17 | Dissolved $O_2$ Removal | 200 | 710 | 720 | 0.9 | 0.7 |
| Ex. 18 | Both | 50 | 700 | 700 | 0.9 | 0.9 |
| Comp. Ex. 5 | None | 200 | 720 | 900 | 0.9 | 0.4 |

INDUSTRIAL APPLICABILITY

The present invention is useful as a constituent element of optical fibers and optical fiber cables intended to be used for high-speed communication, and by varying the shape, can be applied as an optical component such as an optical waveguide or other such light conducting element; a lens used for a still camera, a video camera, a telescope, eyeglasses, soft contact lenses, a solar light collector, and so forth; a mirror such as a concave mirror or a polygon mirror; or a prism such as a pentaprism.

Thus, the present invention can be used as wiring for sending digital signals and/or sending an amount of light, in audio applications, in-plant communications applications, on-board automotive communications applications (navigation systems, road and traffic management systems, automatic toll collection systems, and so forth), in-home communications applications, decorative or lighting applications (signs, billboards, building lighting, pool lighting, optical fiber decorative articles, gallery lighting, fiber screens, and so forth), video applications, optical inspection, sensors, or other such industrial applications, medical applications, and so on.

| Description of the Numerals | |
|---|---|
| 1 | two-layer mold |
| 2 | core component extruder |
| 3 | cladding component extruder |
| 4 | dopant diffusion tube |
| 5 | roll |
| 6 | take-up roll |
| 7 | optical fiber |
| 10 | melt extrusion dopant diffusion apparatus |

The invention claimed is:

1. A GI type optical fiber comprising a core component and a cladding component disposed around the outer periphery of the core component,
wherein the core component includes a dopant and a polymer of monomers containing methyl methacrylate and at least 55 wt% of chlorostyrene monomer, and
wherein the cladding component includes a polymer of a monomer containing at least 35 wt% of methyl methacrylate.

2. The GI type optical fiber according to claim 1,
wherein the polymer included in the core component is a polymer as a predominant constituent component whose structural units are monomers including 55 to 100 wt% chlorostyrene and 0 to 45 wt% methyl methacrylate, and
the polymer included in the cladding component is a polymer as a predominant constituent component whose structural units are monomers including methyl methacrylate and at least one compound selected from the group consisting of styrene, α-methyl styrene and N-cyclohexylmaleimide.

3. The GI type optical fiber according to claim 1, wherein the polymer included in the cladding component is a polymer as the predominant constituent component whose structural units are 35 to 70 wt% methyl methacrylate, 30 to 65 wt% styrene and 0 to 15 wt% N-cyclohexylmaleimide.

4. The GI type optical fiber according to claim 1, wherein the numerical aperture at one or more wavelengths from 630 to 690 nm, expressed as $NA=(n_1^2 - n_2^2)^{1/2}$ (wherein $n_1$ is the refractive index of a center part of the core component, and $n_2$ is the refractive index of the cladding component), is at least 0.25.

5. The GI type optical fiber according to claim 1, wherein a center part of the core component includes 100 weight parts of the polymer and 2 to 8 weight parts dopant.

6. The GI type optical fiber according to claim 1, wherein the chlorostyrene monomer is a monomer whose aniline content is no more than 100 ppm.

7. The GI type optical fiber according to claim 1, which is used in a video-related optical link system.

8. A method for manufacturing a GI type optical fiber comprising:
subjecting a monomer including chlorostyrene to an aniline removal step so that the aniline concentration is no more than 100 ppm with respect to the total monomer weight, and
using a resulting chlorostyrene polymer by polymerizing the monomer thus obtained as a core component to manufacture a plastic optical fiber composed of the core component and a cladding component disposed around the outer periphery of the core component.

9. The method for manufacturing a GI type optical fiber according to claim 8, wherein the aniline removal step is a method involving adsorptive separation.

10. A method for manufacturing a GI type optical fiber, a plastic optical fiber composed of a core component and a cladding component disposed around the outer periphery of the core component is manufactured by using for the core component a chlorostyrene polymer obtained in a step of removing aniline from a monomer including chlorostyrene and/or a step of removing dissolved oxygen.

11. The method for manufacturing a GI type optical fiber according to claim 10, wherein the dissolved oxygen removal step is a method involving reduced pressure deaeration under ultrasonic waves.

12. The method for manufacturing a GI type optical fiber according to claim 10, wherein the dissolved oxygen removal step is a method involving bubbling with an inert gas.

13. The method for manufacturing a GI type optical fiber according to claim 10, wherein the aniline removal step is a method involving adsorptive separation.

14. A method for manufacturing a GI type optical fiber, a plastic optical fiber composed of a core component and a cladding component disposed around the outer periphery of the core component is manufactured by using for the core component a chlorostyrene polymer obtained by polymerizing a monomer in which the aniline content is no more than 100 ppm with respect to the total monomer weight.

* * * * *